April 12, 1955 C. F. HAMMOND Re. 23,978
MANUAL AND HYDRAULIC POWER ACTUATED STEERING GEAR
Original Filed May 2, 1949 6 Sheets-Sheet 1
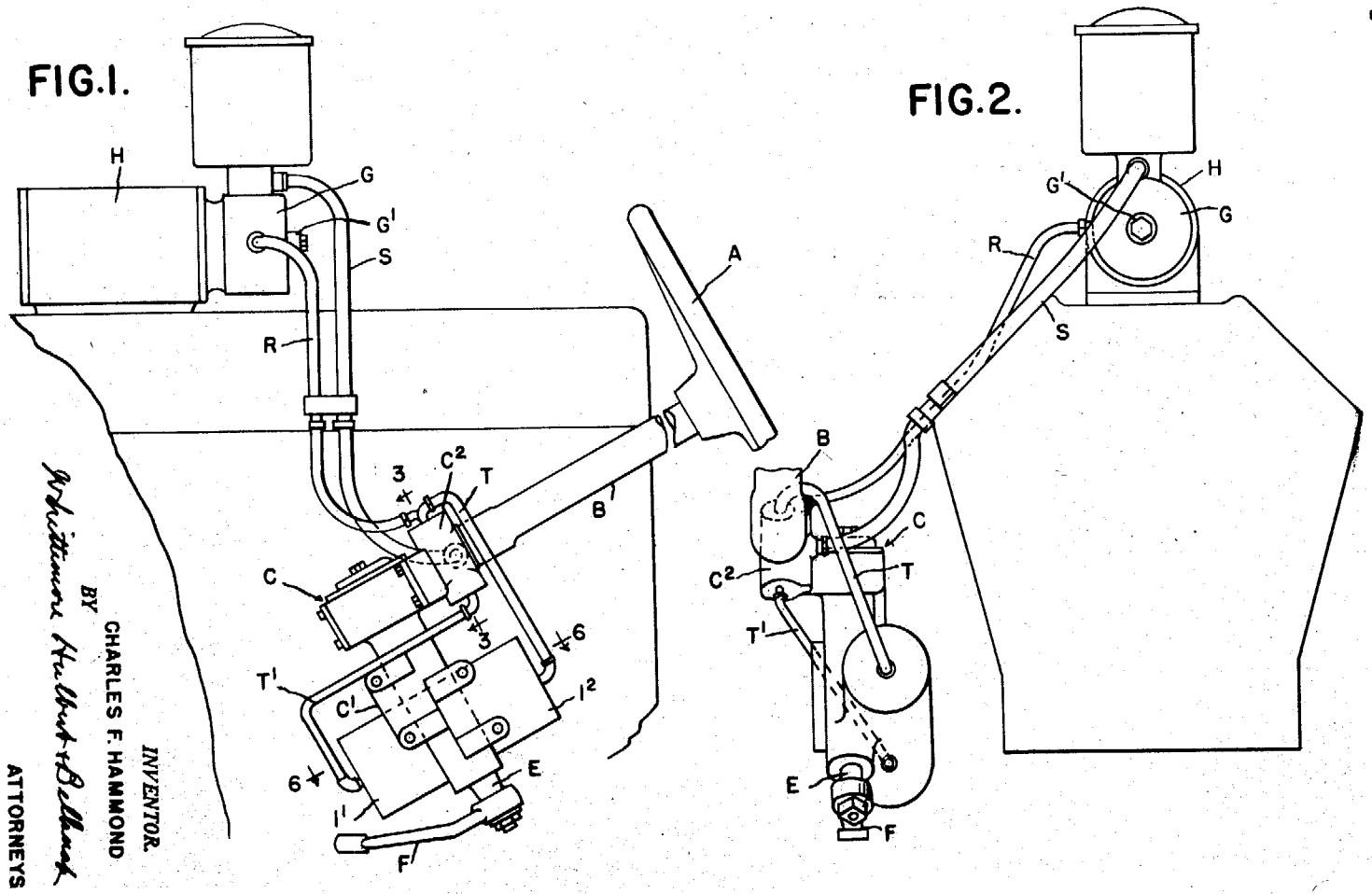
INVENTOR.
CHARLES F. HAMMOND
BY
Whittemore Hulbert & Belknap
ATTORNEYS

MANUAL AND HYDRAULIC POWER ACTUATED STEERING GEAR

Original Filed May 2, 1949 6 Sheets-Sheet 2

*INVENTOR.*
CHARLES F. HAMMOND
*BY*
Whittemore Halbert & Belknap
ATTORNEYS

MANUAL AND HYDRAULIC POWER ACTUATED STEERING GEAR

Original Filed May 2, 1949 6 Sheets-Sheet 3

INVENTOR.
CHARLES F. HAMMOND
BY
Whittemore Hulbert & Belknap
ATTORNEYS

MANUAL AND HYDRAULIC POWER ACTUATED STEERING GEAR

Original Filed May 2, 1949 6 Sheets-Sheet 4

INVENTOR.
CHARLES F. HAMMOND
BY
Whittemore Hulbert & Belknap
ATTORNEYS

MANUAL AND HYDRAULIC POWER ACTUATED STEERING GEAR

Original Filed May 2, 1949 6 Sheets-Sheet 5

INVENTOR.
CHARLES F. HAMMOND
BY
Whittemore Hulbert & Belknap
ATTORNEYS

MANUAL AND HYDRAULIC POWER ACTUATED STEERING GEAR

Original Filed May 2, 1949 6 Sheets-Sheet 6

INVENTOR.
CHARLES F. HAMMOND
BY
Whittemore, Hulbert & Belknap
ATTORNEYS

United States Patent Office

Re. 23,978

Reissued Apr. 12, 1955

23,978

MANUAL AND HYDRAULIC POWER ACTUATED STEERING GEAR

Charles F. Hammond, Grosse Pointe, Mich., assignor to Gemmer Manufacturing Company, Detroit, Mich., a corporation of Michigan Original No. 2,650,669, dated September 1, 1953, Serial No. 90,858, May 2, 1949. Application for reissue May 26, 1954, Serial No. 432,628

7 Claims. (Cl. 180—79.2)

Matter enclosed in heavy brackets [ ] appears in the original patent but forms no part of this reissue specification; matter printed in italics indicates the additions made by reissue.

The invention relates to steering gears more particularly designed for use on motor driven road vehicles, and it is the object of the invention to obtain a construction which is under complete manual control but in which the greater part of the energy required for its operation is supplied by power driven mechanism.

To this end the invention consists, first, in a construction in which the torque manually applied to the hand wheel is transmitted uninterruptedly to the angular adjusting means for the ground wheels.

The invention further consists in the combination with such manually operable means of power booster, means which assists but does not interfere with the operation of said manual means.

The invention further consists in the construction in which a reaction from the manual operating means, during the continuous operation of the latter, operates the control for the booster means.

The invention further consists in a construction employing a hydraulic motor for the booster means together with a controlling valve operated by a torque reaction of the manual operating means.

The invention further consists in various features of construction as more fully hereinafter set forth.

In the drawings:

Fig. 1 is a side elevation of my improved steering gear;

Fig. 2 is an end elevation thereof;

In the present state of the art, steering mechanisms have been provided with power actuated means for either completely or partially supplying the energy required for operation. In such constructions it is unusual to operate the controlling means for the motor by the initial actuation of the manually operated means and in advance of the transmission of any movement from the latter to the ground wheels. In other constructions the ground wheels are first actuated by the manual operating means and subsequently the power means is applied to assist in the operation. It is one of the features of my improved construction that the manual and the power actuation occur simultaneously but with the energy supplied respectively in predetermined ratio to each other. This results in a much smoother action and without a feeling by the operator of any change in effort. However, the operator will always feel a reaction to the load and will carry by his own effort some small fraction thereof as, for instance, twenty per cent.

As illustrated, particularly in Figs. 1 and 2, A is the manually operated steering wheel, B the steering column and C a casing on which said column is mounted and which contains the transmission gearing including the usual worm and worm wheel D and D′ and rock shaft E, which latter has mounted on its outer end the rock arm F for connection with the drag links (not shown). The casing C is formed of connected sections including a section C′ for the hydraulic motor and its connecting mechanism. Hydraulic fluid under pressure is supplied by a rotary pump G, which may be conveniently mounted on the end portion of a shaft G′ of the electric generator H. Thus, whenever the engine of the motor vehicle is in operation, fluid under pressure will be supplied to the booster motor as will be later described.

The booster motor I preferably comprises a pair of opposed cylinders I′ and $I^2$ mounted on opposite sides of the casing section C′. J is a piston member having piston heads J′ and $J^2$ respectively engaging the cylinders I′ and $I^2$ and also having an intermediate connecting shank $J^3$. The axis of the cylinders and piston is transverse to and offset above the axis of the rock shaft E, and the latter has mounted thereon a rock arm K having a roller K′ at its free end for engaging bearings $K^2$ and $K^3$, respectively, connected to the pistons J′ and $J^2$. The arrangement is such that movement of the piston member J with respect to the cylinders I′ and $I^2$ will rock the arm K and the shaft E connected thereto, motion being transmitted through the roller K′ and bearings $K^2$ and $K^3$. Thus, assuming that the piston is actuated by hydraulic fluid, power will be transmitted therefrom to the rock shaft E and rock arm F, which latter angularly adjusts the ground wheels.

Figure 10:
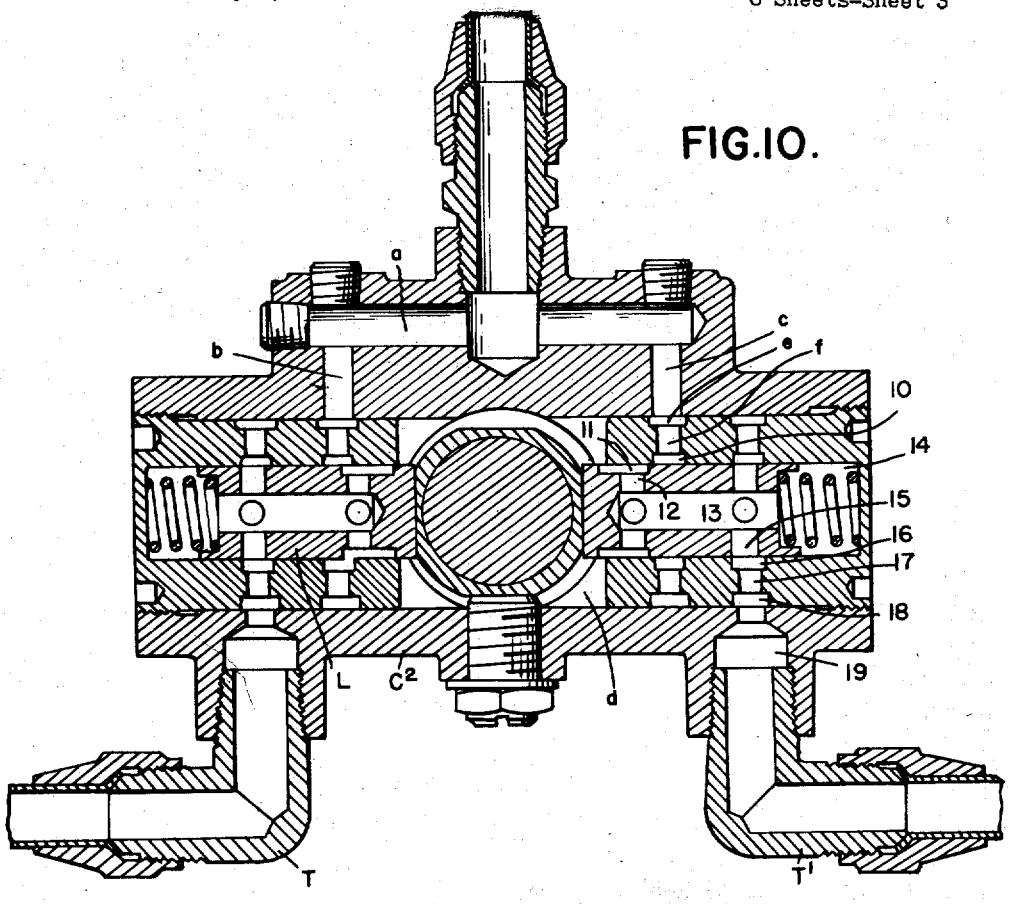
Fig. 10 is a diagrammatic view illustrating the operation of the controlling valve.

The operation of the hydraulic motor I is controlled by a valve mechanism which as previously stated is operated by a torque reaction from the manual operating means. Also this torque reaction occurs during transmission of power from the wheel A to the rock arm F, this being accomplished by the following construction. L is the steering stem extending from the wheel A through the hollow column B into the casing C. M is a shaft separate from the stem L on which shaft is mounted the worm D. Rotation of the stem L is communicated to the shaft M through torque transmission means which, as specifically shown, comprises a pair of intermeshing spur gears N and N′ respectively mounted on said stem and shaft. The shaft M is journaled in bearings which hold it to a fixed axis of rotation. The stem L however is mounted near its lower end in a floating bearing O, which permits a limited amount of lateral movement transverse to the common axial plane of the stem and shaft. Thus, when torque is transmitted through the intermeshing gears N and N′, there will be a reaction tending to displace the bearing O carrying with it the stem L. This displacement is however limited to a small amount such, for instance, as .020 of an inch, as will now be explained. $C^2$ is a portion of the casing C between the column B and the portion containing the shaft M, which portion $C^2$ is in the form of a cylinder having its axis transverse to the axis of the stem L. The bearing O is located centrally within this cylindrical casing, being held from axial displacement on the stem L by collars O′ and $O^2$, which latter may be retained by a snap ring $O^3$ engaging a groove in the stem. The bearing O is preferably of an anti-friction construction as by means of the needle rollers $O^4$. To hold the gears N and N′ in proper mesh with each other, a screw P is engaged with one wall of the casing $C^2$ to adjustably bear against a face of the bearing O diametrically opposite to the intermeshing teeth of the gears. On opposite sides of the bearing O and within the casing $C^2$ are like piston valve assemblies, each comprising a movable piston member Q and a stationary cylinder member Q′, which latter is in the form of a bushing secured within the casing $Q^2$. The piston members Q contact with opposite sides of the bearing O and are yieldably pressed thereagainst by springs $Q^3$. The valve is connected to the pump G by a conduit R for the pressure fluid and a return conduit S for the exhaust fluid. There are also conduits T and T′ leading from the valve to the opposite cylinders I′ and $I^2$ of the booster motor. Pressure fluid from the conduit R enters the casing C passing through a channel a extending longitudinally in a wall thereof and connecting with cross channels b and c leading to the respective valve assembles. In the neutral position of the valve, the fluid flows therethrough into a central chamber d in the casing $C^2$ from which it flows through the return conduit S. More in detail, the pressure fluid from each of the passages b and c enters an annular channel e in the outer surface of the cylinder bushing Q' and through connecting radial ports f to the inner space of said cylinder. As shown more or less diagrammatically in Figure 10, the ports f connect with an annular channel 10 in the inner face of the member Q', which normally overlaps an annular channel 11 in the outer face of the piston Q, and which latter channel normally overlaps and connects with the chamber d which is between the piston assemblies. Thus it is apparent that the pressure fluid from the conduit R divides and passes through both valve assemblies into the chamber d and thence back through the conduit S to the pump. The channel 11 is connected by radial ports 12 with a chamber 13 centrally within the piston Q extending to the outer end thereof into a closed chamber 14 within the outer end portion of the cylinder Q'. The chamber 13 is further connected by radial ports 15 with an annular channel 16 in the inner face of the cylinder Q', and this channel is connected by radial ports 17 with an annular channel 18 in the outer face of the bushing Q', which at one point communicates with an outlet passage 19 connecting with the conduit T or T'.

*Operation*

When the pump G is in operation and the wheel A is in neutral position, the flow of hydraulic fluid will be as above described, passing from the conduit R through the two valve assemblies into the chamber d and then returning through the conduit S to the pump. If, however, the wheel A is turned in either direction this will, through the stem L, communicate torque to the gear N and from the latter through the gear N' to the shaft M. However, the load on the shaft M will resist turning thereof and the torque reaction will communicate to the gear N a slight planetary movement about the gear N'. This will displace the floating bearing O which, in turn, with the cooperation of the springs $Q^3$ will move the pistons Q. The piston on one side of the bearing will be shifted so that the channel 11 will first restrict and then cut off its connection with the chamber d and at the same time enlarge its communication with the channel 10. On the other hand the piston on the opposite side will be moved to first restrict and then cut off communication between the annular channel 10 and the channel 11 and at the same time will enlarge the communication between the channel 11 and the chamber d. The result will be a smooth flow of power to the booster motor I, pressure fluid entering one of the cylinders I' and $I^2$ and being exhausted from the other cylinder to flow back through the valve to the return conduit S and to the pump. It is to be also noted that the resistance to the turning of the wheel A builds up as the fluid pressure increases in the one valve cylinder, for this pressure acts against the outer end of the valve piston tending to move it counter to the direction in which it was moved by the displacement of the bearing O. If, therefore, the turning force applied to the wheel A is relaxed, the pressure of the piston against the bearing O will return the latter to a neutral position and this, through the reaction of the torque transmitting gears N and N', will reversely rotate the wheel A to neutral. If at any time the power should fail, the steering mechanism can still be operated manually through the wheel A and without any back lash in the torque transmission.

Figure 3:
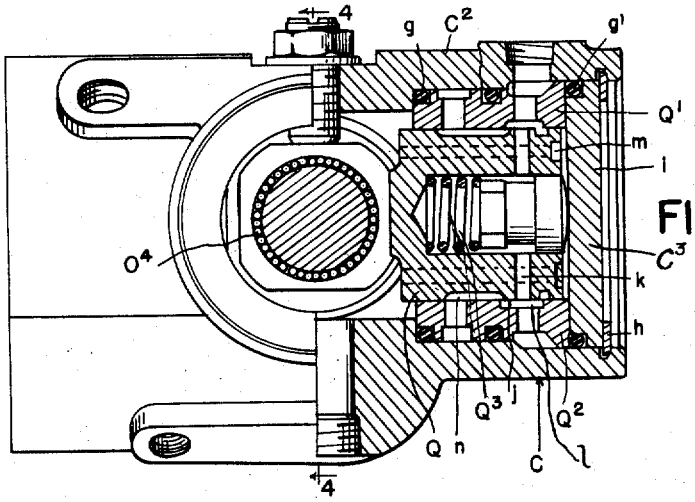
Fig. 3 is a cross section substantially on line 3—3, Fig. 1.
Figure 4:
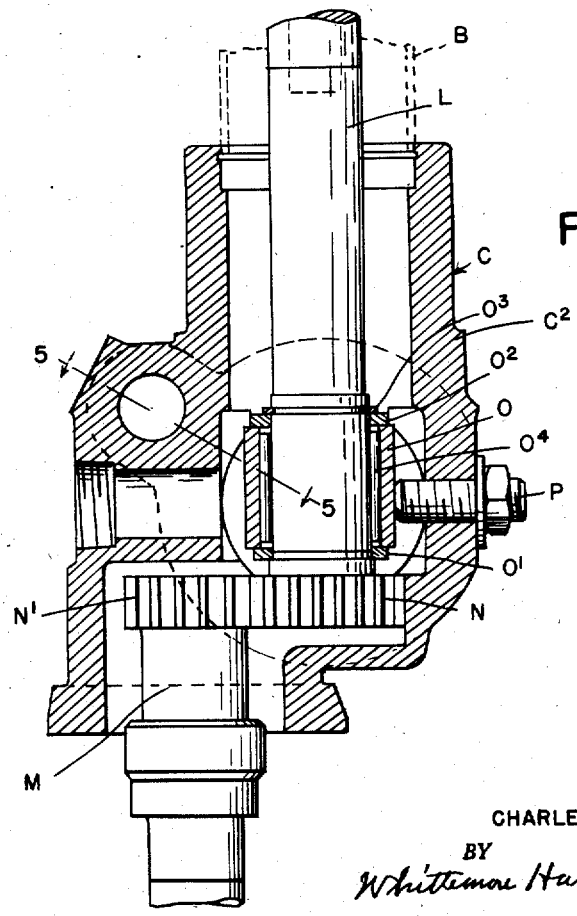
Fig. 4 is a section on line 4—4, Fig. 3.
Figure 5:
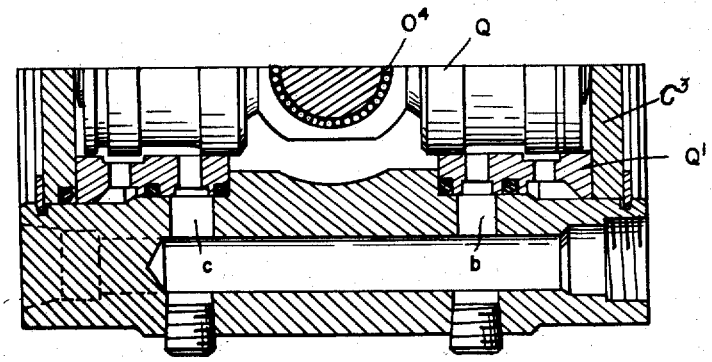
Fig. 5 is a section on line 5—5, Fig. 4.
Figure 6:
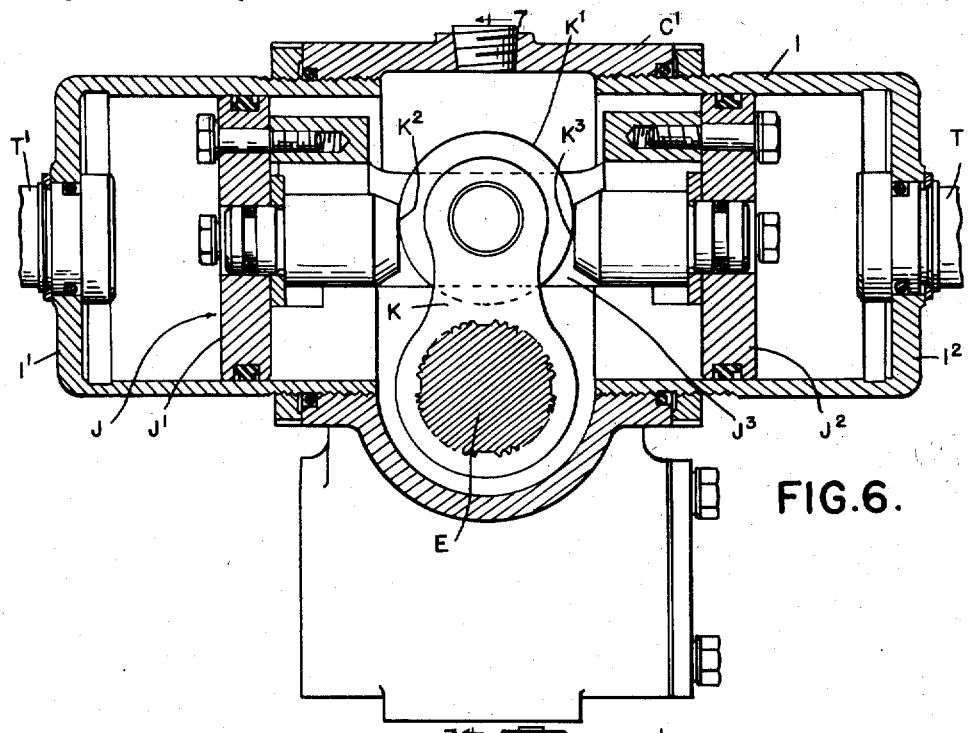
Fig. 6 is a section on line 6—6, Fig. 7.
Figure 7:
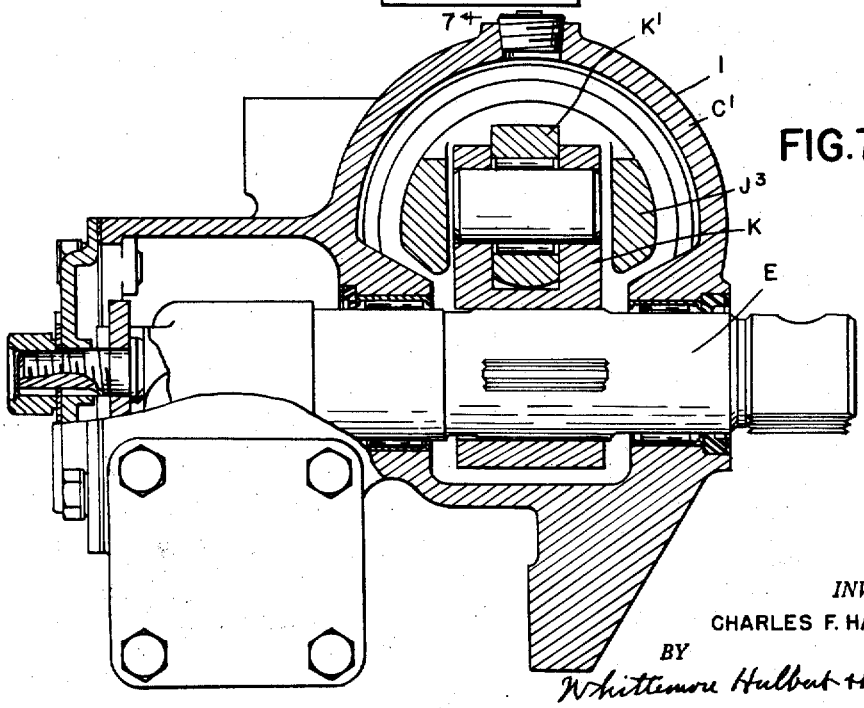
Fig. 7 is a section on line 7—7, Fig. 6.

The valve construction illustrated in Figures 3 and 5 is modified somewhat from that of the diagram 10. As shown in these figures, the valve cylinders or bushings Q' engage counterbores in the casing $C^2$ bearing against a shoulder at the inner end thereof and being sealed by suitable packing rings g. The outer end of the casings $C^2$ is closed by a head $C^3$ bearing against the outer end of the bushing Q', being sealed by a packing ring g' and being detachably secured by a snap ring h engaging a groove in the casing $C^2$. The length of the piston Q is restricted so that in the neutral position of the valve there is a slight clearance space between the outer end of the piston and the head $C^3$. The central recess within the piston is closed at its outer end by a slidable plug i and the spring $Q^3$ is arranged between this plug and the inner end of the recess, thereby holding the plug i against the head $C^3$ and yieldablly pressing the piston Q against the bearing O. The outer cylindrical face of the piston Q is cut away on opposite sides of a portion j through which radial ports k extend from the central recess. The bushing cylinder Q' has an annular channel l in its inner face, which channel is of greater width than the portion j and in the normal position of the valve overlaps this portion at both ends. The piston Q' is further provided with a series of longitudinally extending channels m in the wall thereof outside of the central recess, which places the clearance space at the outer end of the piston in communication with the central chamber d in the casing $C^2$. The operation of this valve is generally the same as described in connection with Figure 10. However, the pressure fluid normally passes from the channel e and radial ports f into the clearance space n around the piston which overlaps the annular channel l in the cylinder Q'. As this channel l also overlaps a clearance space o outside of the portion j, the fluid will flow into the clearance space at the end of the valve and then through the longitudinal channels m into the central chamber d. The annular channel l also communicates through radial ports j with one of the conduits T or T' leading to the booster cylinder, and, therefore, when the piston Q is shifted outward by displacement of the bearing O it will cut off connection between said channel l and the space at the outer end of the piston, diverting the pressure fluid through the ports p to the conduit T or T'.

Figure 9:
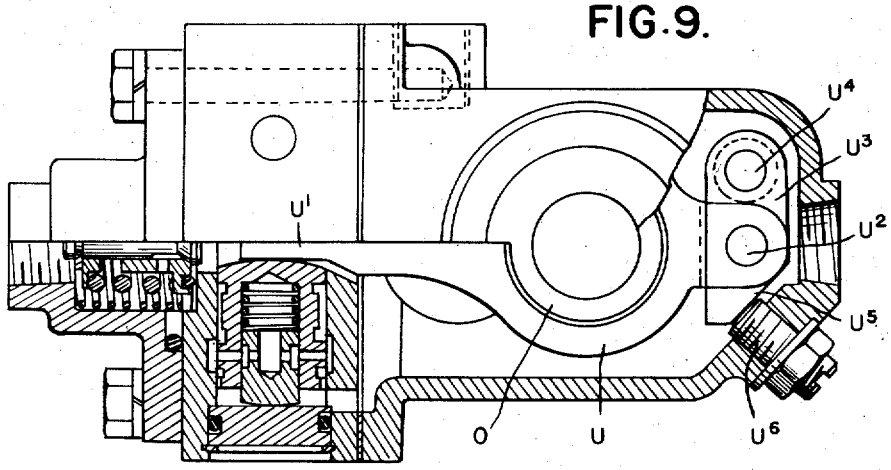
Fig. 9 is a sectional plan view of Fig. 8.
Figure 8:
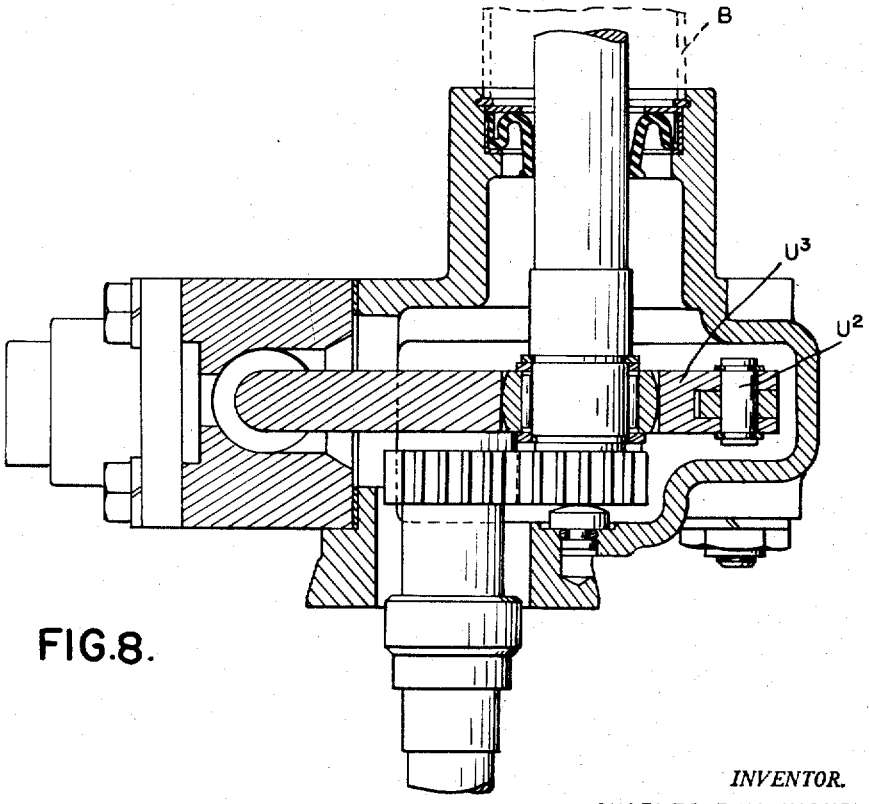
Fig. 8 is a section corresponding to Fig. 4 showing a modified construction.

One important feature of my invention is the means for reducing to the minimum frictional resistance to the operation of the manually actuated mechanism. As before described this mechanism receives a portion of the torque load but it is desirable to avoid any frictional resistance which would interfere with the freedom of movement. Thus, with the construction thus far described, the only frictional resistance is that of the screw P which contacts with the bearing O when the latter is displaced by torque reaction. A modified construction is illustrated in Figs. 8 and 9 in which the bearing O is carried by a lever U, the free end U of which extends between the piston valve members Q. The lever U is fulcrumed on a pin $U^2$ carried by a transverse lever $U^3$ fulcrumed at $U^4$ and having an obliquely extending free end $U^5$ engaged by a screw $U^6$ for adjusting the same. As the bearing O is located much nearer the fulcrum than the portion U', a relatively small displacement of said bearing will produce the desired movement of the valve members. This will further reduce frictional resistance to manual operation.

Figure 12:
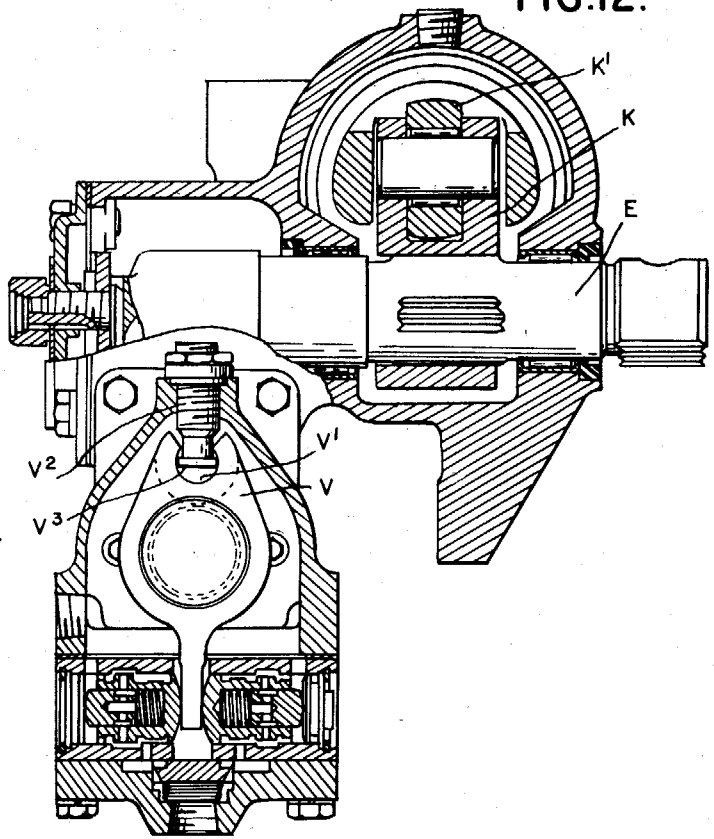
Fig. 12 is a cross section showing another modification.
Figure 11:
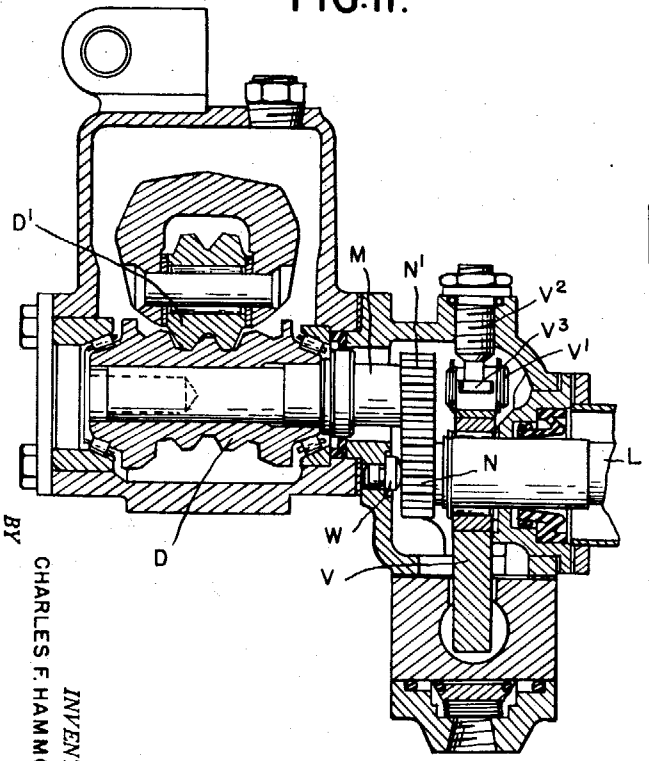
Fig. 11 is a longitudinal section.

Another modified construction is illustrated in Figs. 11 and 12. In this construction a lever V, similar to the lever U and engaging the valve members in the same manner, is fulcrumed on a pin bearing V', which in turn is adjusted by a screw $V^2$ having a swivel engagement $V^3$ with said pin bearing. The stem L, which carries the gear wheel N, has a roller end thrust bearing W engaging the same so as to permit free movement of the stem with the lever V and also free rotation of the stem in the bearing O. Consequently, the only resistance to the rotation of the stem by the hand wheel is that portion of the load which is transmitted thereto by the fluid pressure operating upon the valve members tending to restore the same to neutral position. In other words, there is no frictional resistance in the manually operated mechanism, but only resistance corresponding to a predetermined portion of the torque load.

What I claim as my invention is:

1. In a vehicle steering gear including a manually operable member, a booster motor and steering mechanism for alternative actuation by said manually operable member alone or with the assistance of said booster motor, said mechanism having therein a power increasing transmission; torque transmission means *located* between said manually operable member and said power increasing transmission [including a rotary member having freedom for limited movement transverse to its axis and displaceable] *comprising a single pair of intermeshing gears, one mounted with freedom for limited movement with respect to the other in a direction transverse to its axis and being displaceable within its limits* by torque reaction of the steering load, and valve means actuated by displacement of said member in either of opposite directions to energize said motor in a corresponding direction to carry a portion of the steering load.

[2. The construction as in claim 1 in which the said torque transmission means is formed by a pair of intermeshing gears, one of which is mounted to have freedom for limited planetary movement with respect to the other, in response to the said torque reaction, to actuate said valve means.]

3. The construction as in claim *1* [2] in which said booster is a hydraulic motor.

4. The construction as in claim 3 in which a non-rotatable member is carried by said displaceable gear, and said valve means includes a pair of piston valves located on opposite sides of said non-rotatable member to be actuated by displacement thereof, respectively, in opposite directions, and hydraulic means for actuating each of said valves in the reverse direction.

5. The construction as in claim 4 in which the hydraulic pressure for returning said valves and reacting through said gears on said manually operable member is derived from said motor and is proportionate to the total steering load being carried.

6. The construction as in claim 5 in which the freedom for planetary displacement of said gear is very small and correspondingly limits the movement required for said displacement by said manually operable member.

7. The construction as in claim 6 in which said manually operable member is a wheel and [one of said intermeshing gears is] *both of said gears are* actuated thereby at the same angular velocity.

8. The construction as in claim 7 in which the opposing hydraulic pressures on said valves in the neutral position thereof counterbalance each other and are unbalanced when the valves are displaced from neutral.

References Cited in the file of this patent or the original patent

| | | |
|---|---|---|
| 1,144,552 | Lardner et al. | June 29, 1915 |
| 1,900,218 | Aikman | Mar. 7, 1933 |
| 1,981,591 | Edmonson | Nov. 20, 1934 |
| 2,028,451 | Hodge et al. | Jan. 21, 1936 |
| 2,037,505 | Eaton | Apr. 14, 1936 |
| 2,063,937 | Kundig | Dec. 15, 1936 |
| 2,433,651 | Creson et al. | Dec. 30, 1947 |
| 2,438,316 | Gabriel | Mar. 23, 1948 |